United States Patent [19]

Brambilla et al.

[11] 4,092,397

[45] May 30, 1978

[54] PYROCHEMICAL SEPARATION OF PLUTONIUM FROM IRRADIATED NUCLEAR FUELS, BY THERMAL DECOMPOSITION IN MOLTEN NITRATES

[75] Inventors: Giovanni Brambilla, Stagno (Livorno); Giacomo Caporali, Pisa, both of Italy

[73] Assignee: Agip Nucleare, S.p.A., Rome, Italy

[21] Appl. No.: 667,669

[22] Filed: Mar. 17, 1976

[30] Foreign Application Priority Data

Mar. 17, 1975 Italy .................................. 21319/75

[51] Int. Cl.² .............................................. C01G 56/00
[52] U.S. Cl. ........................................ 423/5; 423/251; 252/301.1 W; 423/11; 423/19
[58] Field of Search ................ 423/5, 251, 11, 19; 252/301.1 W

[56] References Cited

U.S. PATENT DOCUMENTS

| 3,804,939 | 4/1974 | Strickland et al. ................ 423/5 |
| 3,981,960 | 9/1976 | Brambilla et al. ................ 423/5 |

FOREIGN PATENT DOCUMENTS 1,086,966  10/1967  United Kingdom ................ 423/5

*Primary Examiner*—Benjamin R. Padgett
*Assistant Examiner*—E. Suzanne Parr
*Attorney, Agent, or Firm*—Morgan, Finnegan, Pine, Foley & Lee

[57] ABSTRACT

In the recovery of plutonium from irradiated nuclear fuel elements especially those coming from fast nuclear reactors, the improvement consisting in that the spent nuclear fuel elements are subjected to the action of a molten nitrate bath (mixed nitrates of alkali metals or alkaline earth metals), whereafter the plutonium thus obtained is further decomposed in a nitrate bath at a higher temperature, then the plutonium is recovered and a further thermal decomposition of the remaining material at a still higher temperature enables the uranium to be recovered. The recovery of plutonium requires the action of the nitric vapors, the recovery of uranium does not. Molten nitrates can likewise be recovered and recycled.

4 Claims, No Drawings

PYROCHEMICAL SEPARATION OF PLUTONIUM FROM IRRADIATED NUCLEAR FUELS, BY THERMAL DECOMPOSITION IN MOLTEN NITRATES

This invention relates to a method for the pyrochemical separation of plutonium from irradiated nuclear fuels, preferably those coming from fast reactors, as carried out by thermal decomposition of the nuclear fuel ($UO_2$, $PuO_2$ or uranium or plutonium carbides and their mixtures) dissolved in a bath of molten nitrates, by the agency of nitric vapors.

The series of the fast reactors arouses at present a considerable interest and it seems that in the very near future it will have a wide development.

As a matter of fact, fast reactors afford considerable advantages over the thermal reactors:
  they are self-breeding, that is, they generate more fissile material than that they use up.
  they do not require natural uranium but only depleted uranium which is available in huge amounts.
  they do not require, as a result, a separation run for enriching uranium.
  they can reach very high burnups.

As a result of the repercussion of the cost of reprocessing irradiated fuel on the costs of the fuel cycle and then also on the cost of the produced power, it is necessary to find out the processes which are the most suitable from the technical and economical standpoints for carrying out such an operation.

The reprocessing through the wet way, founded on the method of extraction with organic solvents and investigated many years since, is at present the most known also due to the acquired industrial experience and has initially been selected for reprocessing the fuel elements of the fast reactors.

However, the elements coming from this kind of reactors differ considerably from those coming from the thermal reactors as to their nature, their composition, the irradiation rates and the quantities to be treated.

For a few of these aspects the dry reprocessing run seem best to be adapted to this kind of fuel and deserve consideration.

The main new problems of reprocessing as originated by the fuels of the fast reactors are due to the following factors:

1. The high plutonium contents of the fast fuel (15%–20%), which represents a high money value, which remains unproductive when the fuel does not deliver power. Such a value could become an appreciable fraction of the cost of the process of the fuel cycle. It has been estimated that the saving of one month in the duration of the out-of-cell conversion operations of the fuel involves an economy of 0.15 kg/MWe of plutonium involved in the cycle. It is thus apparent the interest one has to minimize the decay times, but the heat dissipation problems, high levels of radioactivity, retention of the fission volatile products, are an exponential function of the decay period and can be solved only by resorting to non-conventional reprocessing methods, such as pyrochemical ones, which afford the following advantages:

use of reactants such as molten salts, which are little sensitive to the radiations and are thermally stable up to high temperatures.
  decrease of criticality problems due to the absence of neutron-moderating water.
  total withdrawal of the volatile fission products (krypton, xenon, iodine and tritium) in a concentrated form.
  direct separation of the other fission products in solid form.
  reduction of the plutonium losses due to the incomplete dissolution of the fuel in nitric acid. It has been estimated that the duration of the decay period, which cannot be shorter than six months in the wet reprocessing with water, can be reduced to one month by reprocessing the fuel with the dry method.

2. The high storage costs of the highly irradiated fuel, which corroborate the necessity of minimizing them by reprocessing the fuel as early as possible after that it has been discharged from the reactor.

3. The transportation of the elements as discharged from the reactor, the cost of which, in the case of a fast reactor, is estimated to a value which is from 5 to 10 times higher than the thermal reactors. Such a cost could also be reduced by erecting a pyrochemical reprocessing installation for the extraction of plutonium, which is simple and self-contained, associated to each reactor or reactor group and reserving the transportation towards the installation for reprocessing to plutonium only, which is but a fraction of the fuel element.

This invention relates, in fact, to a method for the rapid separation and partial decontamination of plutonium from the irradiated fuel and quickly cooled, as based on its dissolution in a molten nitrate bath, by the action of nitric vapors, and on the decomposition by heat of the as-formed plutonyl complex.

In U.S. Pat. No. 3,981,960 reference is made to a method of dissolution of ceramic nuclear fuels after the severing of the fuel element as discharged from the reactor (oxides or carbides of uranium and plutonium) in a low-melting molten salt bath, such as nitrates of alkali metals and alkaline earth metals, by a stream of nitric vapors caused to bubble through the same bath.

It has now been found that, upon dissolution of the fuel in the molten nitrates, it is possible, by raising the reaction temperature beyond 300° C and by maintaining a nitric vapors atmosphere by closing the reactor or by bubbling the same vapors continuously, to obtain a complete precipitation of plutonium within a few hours due to the effect of the lower thermal stability of the plutonyl complex over that of the uranyl complex which is also present.

The chemical form of the precipitated plutonium is not known, but presumably it is an oxide or plutonate.

The extracted plutonium contains a certain percentage of coprecipitated uranium, from 2% to 5% of that initially present, but it is thoroughly decontaminated from the volatile fission products (rare gases, iodine, tritium and ruthenium) and insoluble fission products, separated by filtration (noble metals, zirconium and niobium) and partially from the soluble ones which are not decomposed by heat (rare earth metals, with the exception of cerium, alkaline earth metals, cesium).

In the following Table 1 the decontamination factors are reported, as obtained in laboratory tests as effected with mixed oxides $UO_2$, $PuO_2$ and irradiated $UO_2$, as well as the data relating to the plutonium recovery.

TABLE 1
AVERAGE DECONTAMINATION FACTORS OF THE PRINCIPAL (*) FISSION PRODUCTS
(Plutonium base)

| ELEMENT | DECONTAMINATION FACTOR |
|---|---|
| Iodine | $> 10^2$ |
| Cesium | $> 10^2$ |
| Cerium | 1.5 |
| Ruthenium | $> 10^2$ |
| Zirconium | $\sim 50$ |
| Zirconium-niobium | $\sim 15$ |
| U/Pu separation ratio (**) | 50 |
| Plutonium recovery | $\geq 99\%$ |
| Residual Pu in the molten state | $\leq 20$ ppm |

(*) Defined as a ratio of the element to plutonium in the starting product, divided by the same ratio in the end product.
(**) Defined as the ratio of uranium to plutonium, in the starting product, divided by the same ratio in the end product.

If the thusly separated plutonium should not fulfil the requested specification, it must be further purified, either with the dry method in a multistage run or by the aqueous way prior to being sent to the refabrication of the fuel element to be admixed with other natural or depleted uranium.

Impoverished uranium, the fissile value of which is nil, is, conversely, discarded from the cycle and stored in situ in an unalterable and insoluble form.

It can also be recovered if justified by economical reasons, in the form of an alkali metal uranate by subsequent decomposition with heat at a higher temperature.

The molten nitrates are conversely regenerated from the fission products which were left in solution, by thermal decomposition at temperatures which are still higher and by flowing over inorganic exchangers, and then they are recycled.

Thermal decomposition, which is the subject-matter of the present invention, as shown in the following block diagram of the pyrochemical process for the separation of plutonium takes place through the following stages:

(a) Severing of the nuclear fuel element as discharged from the reactor.
(b) Disaggregation and dissolution of the oxides or carbides which make up the nuclear material in a bath of molten alkali metal or alkaline earth metal nitrates, by the agency of nitric vapors.
(c) Collection on a filter of the fission products which did not pass in solution (noble metals, zirconium and niobium).
(d) Decomposition by heat of the plutonium, as obtained by raising the temperature beyond 300° C and by maintaining a nitric vapor atmosphere.
(e) Collection on a filter of the precipitated plutonium as a result of decomposition by heat.
(f) Recovery of uranium by decomposition at a higher temperature (300° C) without any necessity of nitric vapors.
(g) Regeneration and recycling the molten nitrates by decomposition by heat at still higher temperature (400° C).

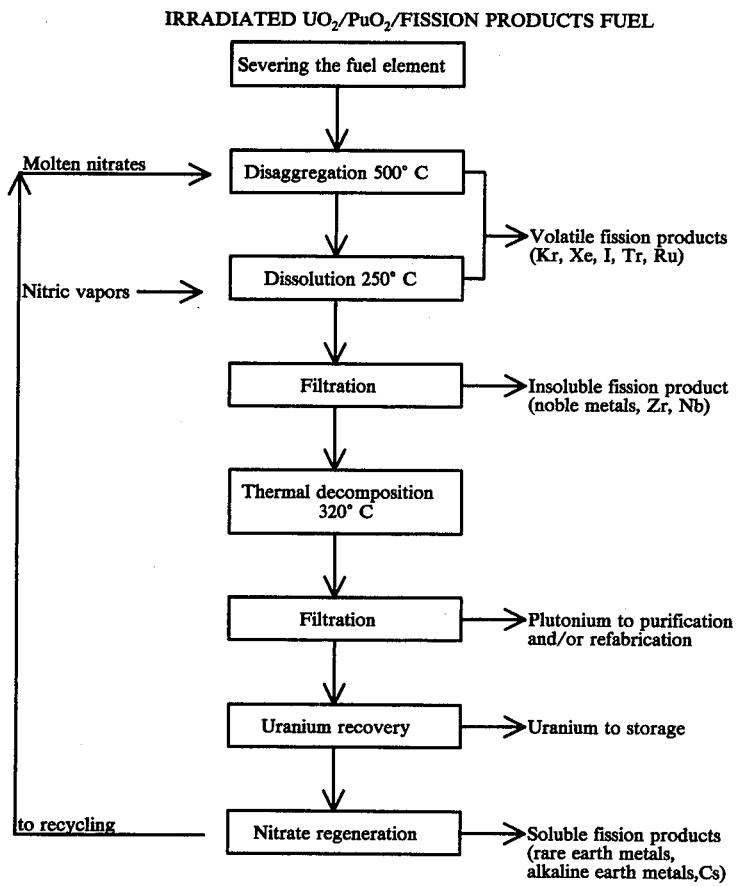

Block Diagram of the pyrochemical plutonium separation process.

The following Examples are given by way of example only without limitation of the present invention.

EXAMPLE 1

A sintered pellet of $UO_2$–$PuO_2$ containing 18.3% of $PuO_2$, weighing 1.225 grams was disaggregated at 480° C in a molten salt bath composed by 100 grams of an eutectic mixture $NaNO_3$–$KNO_3$ (45.7–54.3% on a weight base), then dissolved at a temperature of 250° C by having a stream of vapors of nitric acid as entrained by an inert gas flowing and bubbling through the same bath.

Upon dissolution the reactor was closed so as to maintain a nitric atmosphere over the bath and the temperature abruptly raised to 360° C and then maintained at 300° C during 18 hours.

After that time period more than 99% of the initially present plutonium was precipitated and 5.4% of uranium.

EXAMPLE 2

A sintered pellet of $UO_2$–$PuO_2$ containing 15% of $PuO_2$ weighing 1.322 grams was dissolved, by operating as in the Example 1, in 100 grams of an eutectic mixture of $NaNO_3$–$KNO_3$–$LiNO_3$ (15.3–61.4–23.3, percent by weight) then subjected to thermal decomposition under the same temperature conditions as in Example 1.

After 17 hours more than 99% of the initially present plutonium and 2% of the initially present uranium were precipitated.

EXAMPLE 3

A sintered pellet of $UO_2$–$PuO_2$ containing 10% of $PuO_2$, weighing 1.052 grams, was dissolved in 100 grams of ternary eutectic mixture $NaNO_3$–$KNO_3$–$LiNO_3$ by operating such as in Example 1, then the temperature was raised to 350° C without discontinuing the bubbling of nitric vapors through the bath.

After 6 hours of stay at such a temperature more than 99% of the initially present plutonium and 7.2% of initially present uranium had been precipitated.

EXAMPLE 4

A sintered pellet of $UO_2$–$PuO_2$ containing 14.3% of $PuO_2$ was dissolved in 100 grams of binary eutectic mixture $(Ca(NO_3)_2$–$KNO_3$ (44.8–55.2 percent by weight) by operating as in Example 1, and the thusly obtained solution was subjected to thermal decomposition while maintaining it at 300° C during 15 hours in a closed reactor.

After such a time period more than 99% of the initially present plutonium, and 7.2% of the initially present uranium had been precipitated.

EXAMPLE 5

A sintered pellet of $UO_2$–$PuO_2$, containing 15.0% of $PuO_2$ weighing 1.339 grams and a $UO_2$ pellet weighing 1.341 grams, irradiated during one hour in a reactor at a rate of flow of $6.3 \cdot 10^{12}$ n/cm² s and decayed for two months, admixed with 0.302 grams of nonirradiated $UO_2$ but containing a synthetic mixture of stable isotopes simulating a burnup of 5.6% were dissolved in 100 grams of a binary eutectic mixture $NaNO_3$–$KNO_3$, operating as in Example 1 and the thusly obtained solution upon filtration and stripping of the undissolved fission products, subjected to thermal decomposition by abruptly raising the temperature to 360° C and maintaining then it at 300° C during 21 hours.

After such a period of time more than 99% of the initially present plutonium and 3.5% of the uranium, the approx. 65% of cerium had been precipitated, whereas the ruthenium was completely evaporated off and cesium wholly passed in solution without thermal decomposition.

Zirconium and niobium which had partially been dissolved, were present in tract amounts in the plutonium precipitate.

While the present invention has been described with reference to a determined embodiment as shown in the Examples, the scope of the invention can undergo a number of other applications.

In addition, without departing from the scope of the invention many changes can be introduced in the reduction of the present invention to practice, all within the above explained basic concepts.

What we claim is:

1. A method for the pyrochemical separation of plutonium from an irradiated nuclear fuel element discharged from a fast reactor and containing uranium oxide and plutonium oxide, or uranium carbide and plutonium carbide mixtures thereof, which comprises the following steps:
    a. severing the irradiated nuclear fuel element;
    b. disaggregating the fuel element by placing it in a bath of a molten alkali metal nitrate and/or alkaline earth metal nitrate heated to 480°–500° C;
    c. effecting dissolution of the oxides and/or carbides in the bath produced through step b by passing nitric vapors through said bath at a temperature of 250° C;
    d. filtering insoluble fission products out of the bath produced by step c;
    e. decomposing the plutonium compound in the filtrate from step d by raising the temperature of said filtrate to 300° C and holding the same in an atmosphere of nitric vapors so that plutonium is precipitated; and
    f. filtering out the plutonium precipitated in step e.

2. A method for the pyrochemical separation of plutonium from an irradiated nuclear fuel element as claimed in claim 1, which includes drawing off volatile fission products during steps b and c.

3. A method for the pyrochemical separation of plutonium from an irradiated nuclear fuel element as claimed in claim 1, which includes the steps of decomposing the uranium compound in the filtrate produced through step e by elevating the temperature thereof to 350° C, so that uranium is precipitated, and then collecting said uranium.

4. A method for the pyrochemical separation of plutonium from an irradiated nuclear fuel element as claimed in claim 3, which includes regenerating molten nitrates contained in the filtrate from which the precipitated uranium is collected by thermally decomposing said nitrates at a temperature of 400° C and then recycling the same.

* * * * *